United States Patent [19]
Ward et al.

[11] Patent Number: 5,788,428
[45] Date of Patent: Aug. 4, 1998

[54] POWER TOOL DRIVING SYSTEMS

[75] Inventors: John D. Ward, Rocklin, Calif.; Ralph E. Benham, Orlando, Fla.

[73] Assignee: Diamond Tech, Incorporated, Rocklin, Calif.

[21] Appl. No.: 660,332

[22] Filed: Jun. 4, 1996

Related U.S. Application Data

[60] Provisional application No. 60/000,173 Jun. 13, 1995.

[51] Int. Cl.⁶ .................... B23B 35/00; B23B 47/18
[52] U.S. Cl. .................... 408/1 R; 318/566; 408/10
[58] Field of Search ................ 408/1 R, 10, 11, 408/8, 6, 17, 18, 19, 23, 186, 188, 193, 195; 361/23, 24; 318/566, 434, 432

[56] References Cited

U.S. PATENT DOCUMENTS

| Re. 33,732 | 11/1991 | Link | 29/558 |
|---|---|---|---|
| 3,545,310 | 12/1970 | Porath et al. | 408/11 |
| 3,971,168 | 7/1976 | Nishimura et al. | 51/165.8 |
| 4,591,299 | 5/1986 | Eckman | 408/1 |
| 4,778,313 | 10/1988 | Lehmkuhl | 409/127 |
| 4,827,672 | 5/1989 | Brandt et al. | 51/165.9 |
| 4,831,785 | 5/1989 | Sigg | 51/165 R |
| 4,934,105 | 6/1990 | Sigg | 51/165.71 |
| 4,944,643 | 7/1990 | Lehmkuhl | 409/80 |
| 5,054,244 | 10/1991 | Takamatsu et al. | 51/165.71 |
| 5,072,550 | 12/1991 | Matsumoto | 51/290 |
| 5,148,637 | 9/1992 | Byron | 51/165.71 |
| 5,315,789 | 5/1994 | Takashi | 51/165.71 |
| 5,456,147 | 10/1995 | Stange, Jr. | 83/74 |

OTHER PUBLICATIONS

GDP 503 Technical Manual, by MagnaTek, Inc. 1993.
GDP 333 Technical Manual, by MagnaTek, Inc. 1993.

*Primary Examiner*—William M. Shoop, Jr.
*Assistant Examiner*—Kim Lockett
*Attorney, Agent, or Firm*—Benoit Law Corporation

[57] ABSTRACT

Methods and apparatus for cutting a workpiece with a cutting tool rotated relative to the workpiece by an electric drive motor and advanced in that workpiece by an electric tool advance. These methods and apparatus sense obstacles to cutting in the workpiece by sensing an increasing draw of electric power of the electric drive motor in rotating the cutting tool relative to that workpiece, and automatically slow down the electric tool advance in response to such increasing draw of electric power. Such slowed-down electric tool advance drives the cutting tool to cut through the sensed obstacle in the workpiece. The speed of the slowed-down electric tool advance is automatically restored in response to a decrease in the sensed draw of electric power of the electric drive motor in rotating the cutting tool relative to the workpiece, and the cutting tool is advanced in the workpiece with the electric tool advance at the restored speed.

20 Claims, 7 Drawing Sheets

POWER TOOL DRIVING SYSTEMS

CROSS-REFERENCE

This is a regular U.S. patent application claiming priority from co-pending U.S. Provisional patent application 60/000, 173, filed by the subject inventors on 13 Jun. 1995, for Power Tool Driving Systems, and herewith incorporated by reference herein, and such priority is also claimed for any United States patent resulting from such regular patent application.

FIELD OF INVENTION

The subject invention relates to methods and apparatus for driving and advancing concrete saws, concrete drills, or other power tools or toolheads.

BACKGROUND

By way of example, in order to cut a concrete wall with a wall saw, a track must first be securely fastened to the wall by using some form of mechanical or chemical anchor. Once the track is securely fastened to the wall, a carriage, which rides on the track, is then placed on the track. Next, the gearbox and blade carriage are placed on the track carriage.

The track carriage can be moved along the track via a rack and pinion method. The rack gear is on the track and the pinion gear is secured to the track carriage, usually in a 20+:1 gear reduction gearbox, so that adequate torque loads can be transmitted to move the track carriage along the track. The thrust required for cutting pressure on the blade can be as high as 100 pounds.

There are several different methods for entering the blade into the initial contact cut with the concrete, but most (90%) use a double post carriage arrangement with a screw feed. The other method is a radial arm type saw.

Historically, the screw feed, which enters the blade into the concrete, was cranked in by an offset handle arrangement. When the desired depth was reached, the screw was locked by means of a lock screw so that the screw could not unscrew itself once pressure was placed on the blade.

To move the track carriage along the track, a speed wrench with a universal joint (to allow for uncomfortable angles) was cranked or turned by hand. This method worked fine for several years, but required a rigorous and expensive training regimen to teach the operator the meanings of the different feels and sounds the saw makes while cutting. The operator must feed the saw as fast as possible to maximize productivity, but not so fast as to damage the expensive diamond blade. Blade damage occurs quite often when the blade begins to cut into a piece of rebar or reinforcing steel, which is unseen by the operator. Ultimately, each company's productivity is very dependent upon its operators' abilities to recognize the sounds and feels his or her saw makes, and adjust his or her feed rates accordingly. As well known, the construction worker mentality is all too often, "If it won't work, use a bigger hammer," resulting frequently in damaged equipment.

In pressured compensating hydraulic feeds, the hydraulics replaces the hand crank for feeding the blade along the wall, being the most common power feed method used today.

However, such hydraulic pressure compensating feed method is really not very responsive to the loads on the work head. Rather, it is a reaction to the back pressure on the line to the work head which means that by the time a reaction response takes place, most of the damage to the blade or equipment has already occurred. Also, with the fluctuating pressure changes, the result would be fluctuating feed rates. So, although today's hydraulic feeds are in a sense automated, they have left great room for improvement.

SUMMARY OF THE INVENTION

It is a general object of the invention to overcome the disadvantages and to meet the needs expressed or implicit in the text set forth above under Background, or otherwise herein set forth.

It is a germane object of the invention to provide improved methods and apparatus for driving and advancing concrete saws, concrete drills, or other power tools or toolheads.

It is a related object of the invention to provide instantaneous response rates and ideal feed rates that maximize productivity while minimizing equipment damage.

Other objects of the invention will become apparent in the further course of this disclosure.

The invention resides in a method of cutting a workpiece with a cutting tool rotated relative to the workpiece by an electric drive motor and advanced in that workpiece by an electric tool advance, and, more specifically, resides in the improvement comprising, in combination, sensing obstacles to cutting in the workpiece by sensing an increasing draw of electric power of the electric drive motor in rotating the cutting tool relative to that workpiece, automatically slowing down the electric tool advance in response to such increasing draw of electric power, cutting through a sensed obstacle in the workpiece with the cutting tool by driving that cutting tool with the slowed-down electric tool advance, automatically restoring the speed of the slowed-down electric tool advance in response to a decrease in the sensed draw of electric power of the electric drive motor in rotating the cutting tool relative to the workpiece, and advancing the cutting tool in the workpiece with the electric tool advance at the restored speed.

The invention also resides in a method of cutting reinforced concrete with a concrete cutting tool rotated by an electric drive motor and advanced in that reinforced concrete by an electric tool advance, and, more specifically, resides in the improvement comprising, in combination, sensing obstacles to cutting in that reinforced concrete including reinforcing bars by sensing an increasing draw of electric power of the electric drive motor in rotating the concrete cutting tool in the reinforced concrete, automatically slowing down the electric tool advance in response to such increasing draw of electric power, cutting through a sensed obstacle in the reinforced concrete with the concrete cutting tool by driving that concrete cutting tool with the slowed-down electric tool advance, automatically restoring the speed of the slowed-down electric tool advance in response to a decrease in the sensed draw of electric power of the electric drive motor in rotating the concrete cutting tool in the reinforced concrete, and advancing that concrete cutting tool in the reinforced concrete with the electric tool advance at the restored speed.

The invention resides also in apparatus for cutting a workpiece with a cutting tool rotated relative to the workpiece by an electric drive motor and advanced in that workpiece by an electric tool advance, and, more specifically, resides in the improvement comprising, in combination, means for sensing obstacles to cutting in the workpiece, including means for sensing an increasing draw of electric power of the electric drive motor in rotating the cutting tool relative to the workpiece, means between the above mentioned means for sensing an increasing draw of electric power and the electric tool advance for automatically slowing down such electric tool advance in response to the increasing draw of electric power so that the cutting tool cuts through a sensed obstacle in the workpiece while being driven with the slowed-down electric tool advance, and means for automatically restoring the speed of the slowed-down electric tool advance in response to a decrease in the sensed draw of electric power of the electric drive motor in rotating the cutting tool relative to the workpiece so that the cutting tool is advanced in the workpiece with the electric tool advance at the restored speed.

The invention resides also in apparatus for cutting reinforced concrete with a concrete cutting tool rotated by an electric drive motor and advanced in that reinforced concrete by an electric tool advance, and, more specifically, resides in the improvement comprising, in combination, means for sensing obstacles to cutting in the reinforced concrete including reinforcing bars, including means for sensing an increasing draw of electric power of the electric drive motor in rotating the concrete cutting tool relative to such reinforced concrete, means between the above mentioned means for sensing an increasing draw of electric power and the electric tool advance for automatically slowing down such electric tool advance in response to the increasing draw of electric power so that the concrete cutting tool cuts through a sensed obstacle in the reinforced concrete while being driven with the slowed-down electric tool advance, and means for automatically restoring the speed of the slowed-down electric tool advance in response to a decrease in the sensed draw of electric power of the electric drive motor in rotating the concrete cutting tool in the reinforced concrete so that the concrete cutting tool is advanced in the reinforced concrete with the electric tool advance at the restored speed.

The expression "power" is herein employed in a broad dictionary sense signifying ability, latent, exerted or physical, to act or effect, and each and every capacity to produce results. Even where electric current, such as used for energizing a power drive, only becomes closely related to power near maximum load conditions, the phrase "sensing power" is intended to be sufficiently broad to cover a sensing of such electric current.

BRIEF DESCRIPTION OF THE DRAWINGS

The subject invention and its various aspects and objects will become more readily apparent from the following detailed description of preferred embodiments thereof, illustrated by way of example in the accompanying drawings which also constitute a written description of the invention, wherein like reference numerals designate like or equivalent parts, and in which.

DESCRIPTION OF PREFERRED EMBODIMENTS

Preferred embodiments of the invention replace currently inefficient hydraulic feed methods with electric feed methods governed by electric inverters with on-board computers. Systems according to embodiments of the invention preferably utilize a large motor control inverter to power the work head and a miniature motor control inverter to monitor feed motors. The computers preferably are programmed so that they will communicate with each other. The large motor control inverter preferably monitors the current draw on the work head and sends signals to the feed motor computer that runs the electric feed motor. The feed motor will maintain a pressure against the blade or power tool with a force sufficient for the work head to maintain a programmed amperage draw setting.

Advantages of systems according to the subject invention and the embodiments thereof are numerous and include:

1. Constant cutting pressure and torque on the blade or drill bit.
2. Constant cutting pressure on the equipment.
3. If the blade or drill bit get stuck, the computer will overload and shut off without increased torque or thrust on the blade, drill bit or equipment.
4. Instantaneous feed pressure changes in relation to work head current draw.
5. Ability to change blade or drill bit RPM by parallel rising or falling of volts and hertz.
6. Remote control.
7. Feed saw blade into and out of the wall or workpiece in addition to traversing the track in either direction.
8. The speed changes instantaneously.
9. Cutting rates are maximized all the time, providing maximum productivity.

Figure 1:
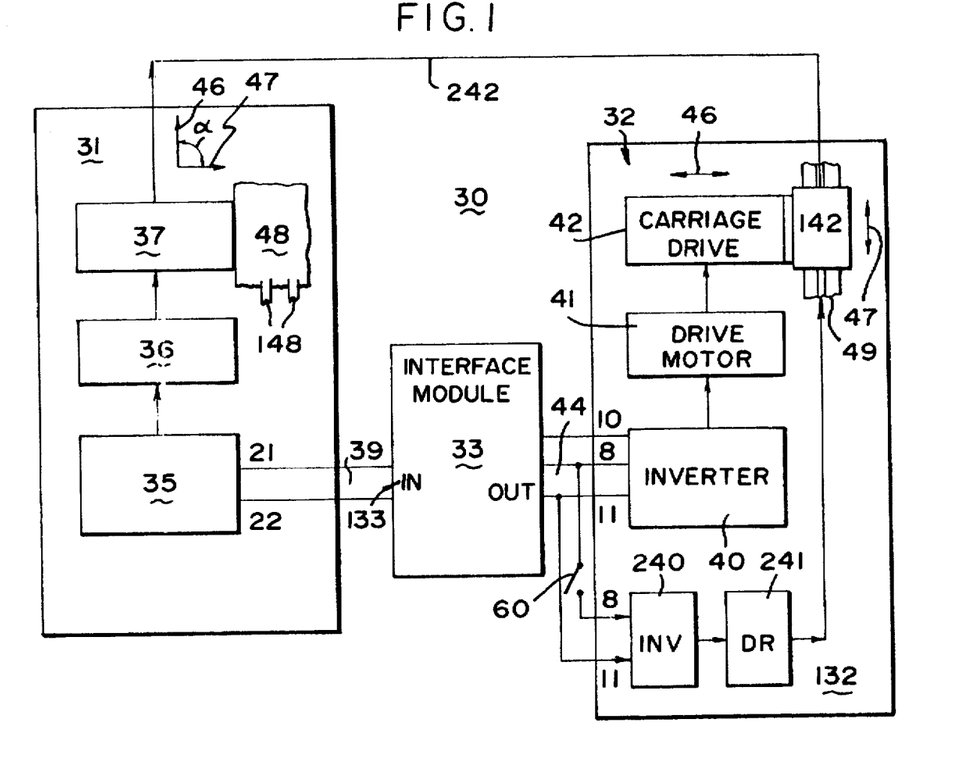
FIG. 1 is a block diagram of a system for driving and advancing a power tool according to a preferred embodiment of the invention.

A system 30 according to a preferred embodiment of the invention comprises three major components: a toolhead drive portion 31, a tool advance portion 32, and a control interface module 33, such as shown in FIG. 1.

The toolhead drive portion 31 may include an motor control inverter 35 and a drive motor 36 for driving a saw blade, drill bit or other power-operated tool or toolhead. 37.

By way of example, the inverter motor control 35 may use the MagneTek GPD 503 motor control, an illustrated description of which has been published in the GPD 503 Technical Manual 4231, by MagneTek Drives & Systems, of New Berlin, Wis. 53151, © 1993.

Such or an equivalent power source may, for instance, be coupled to a high cycle induction motor which is intended to operate from a 400 cycle 3 phase voltage source. This or an equivalent motor serves as the drive motor 36 and is in turn coupled to the saw blade or toolhead 37.

The GPD 503 is an example of a high performance sine-coded pulse width modulated AC motor drive which generates an adjustable voltage/frequency three phase output for complete speed control of a squirrel cage induction motor 36. In addition, it has several output monitor functions, one of which is provision of an electrical control signal 39 which is proportional to the magnitude of the electric current being used by the motor.

The power tool advance portion 32 is similar to the power tool drive portion 31, but may use a smaller motor control inverter 40 and less powerful motor 41 coupled to a tool advance device 42, such as a tool carriage on a tool advance track 49.

By way of example, the tool advance portion 32 may use the GPD 333 MagneTek motor control, an illustrated description or which has been published in the GPD 333 Technical Manual 4333, © 1993 by MagneTek Drives & Systems.

The speed of the drive motor 41 attached to the motor control inverter 40 can be controlled by means of a controlling analog input voltage 44. Such speed is normally controlled from minimum to maximum by adjusting this input from 0 to n volts, with n being about 10 volts in this example. The preferred motor control inverter is a very versatile device and can be programmed to provide a wide range of motor speed versus input control voltage responses. Among which is the ability to reverse the motor direction.

The control interface module 33 is used to process the current output signal 39 from the power tool drive motor control inverter 35 so that such control signal 39 can be used by the tool advance motor control inverter 40 to automatically set the drive motor 41.

Figure 2A:
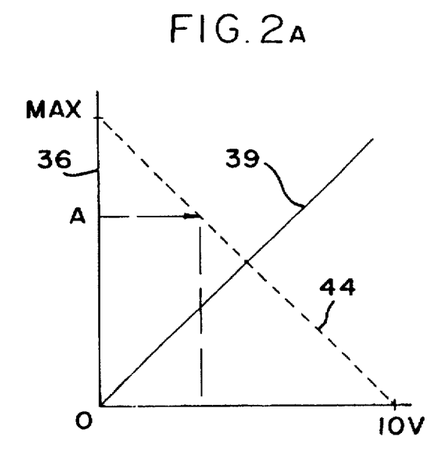
FIGS. 2a to c are graphs illustrating phases of operation of the system of FIG. 1, such as more fully set forth below.

The graph of FIG. 2a represents the current monitor voltage output 39 of the toolhead drive motor control inverter 31, which may be set so that such output 39 is 0 volts for 0 current to motor 36 and 10 volts for maximum current to the toolhead motor 36.

Figure 2B:
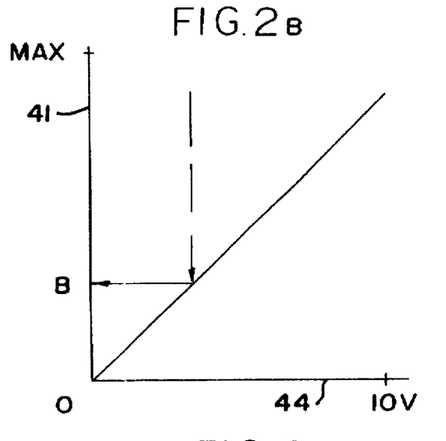

The graph of FIG. 2b represents the controlled speed of the tool advance motor 41 versus the input control voltage 44. It is set so that 0 volts will cause the motor 41 to stop and 10 volts will cause that motor 41 to run at the maximum speed.

In practice, simply connecting the two leads 21 and 22 supplying the control signal 39 together with control input leads 9 and 11 would not provide the desired control function. As the current required by the toolhead drive motor 36 would increase, it would cause the speed of the tool advance motor 41 also to increase. However, an object of the invention is to have the tool advance motor 41 slow down, as the current of the toolhead drive motor 36 increases. The control interface module 33 uses as its input at 133 the current monitor voltage output 39 of the toolhead drive motor control inverter 35 and converts it to a signal 44 that will provide the necessary speed control function to the tool advance motor inverter 40.

Figure 2C:
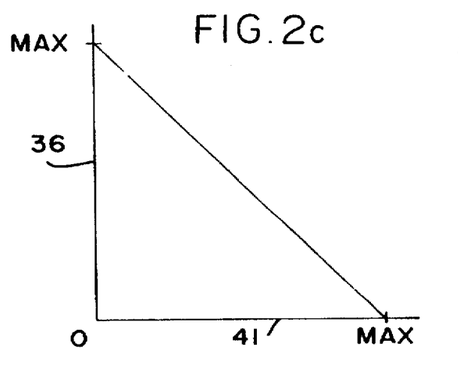

The dashed line 44 in FIG. 2a represents the output of the control interface module 33. Notice that at maximum toolhead drive current the control interface module output voltage 44 is 0 volts and at 0 toolhead drive current that output voltage 44 is 10 volts. By using the two graphs 2a and 2b in conjunction, the speed versus toolhead drive current may be computed and is plotted in graph 2c.

Figure 3:
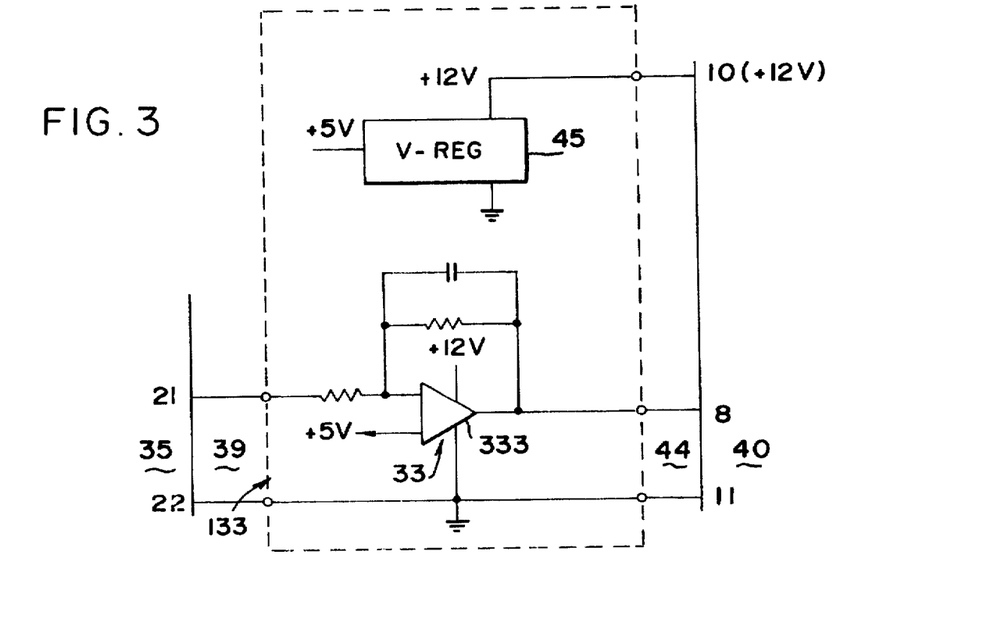
FIG. 3 is a schematic of an operational amplifier that may be used in or as the interface module in the system of FIG. 1.

FIG. 3 shows a first inverting operational amplifier 33 that may be used in or as the interface module in the system of FIG. 1 so as to implement a linear function pursuant to the graph shown in FIG. 2c. This provides a simple linear speed control. In this implementation, the drive motor inverter 40 provides the voltage to power the interface module, such as via a voltage regulator 45. Such voltage is conveniently available. In other embodiments, the interface module 33 may have its own power supply.

Figure 4:
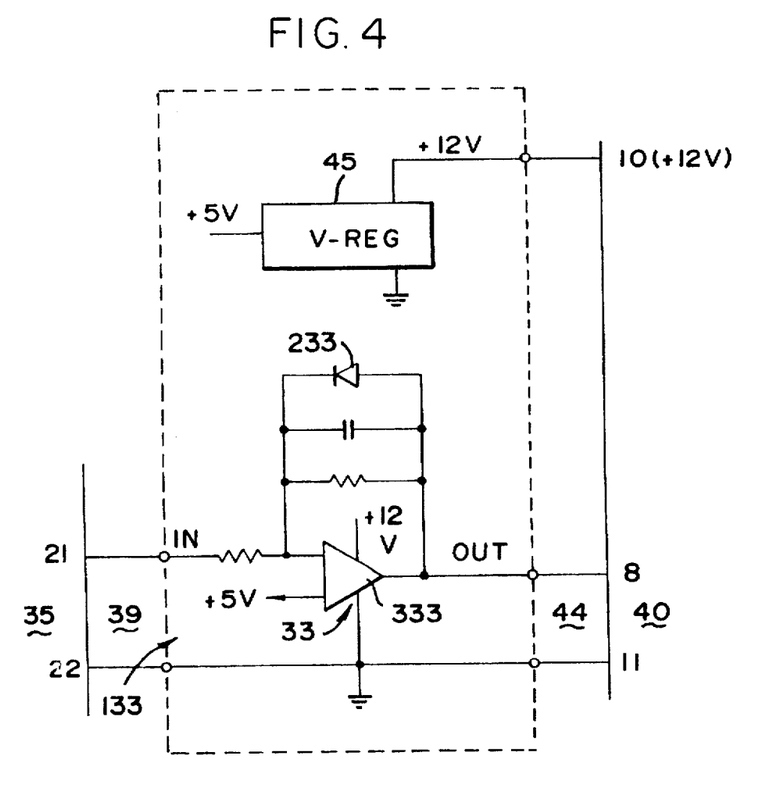
FIG. 4 is a schematic similar to FIG. 3 of an operational amplifier with improved drive motor speed versus saw motor current response.

FIG. 4 is identical to FIG. 3, except that the transfer function of the interface module 33 has been modified, such as by a diode or other unidirectional current conducting device 233 around the inverter OP AMP 333, to provide an improved drive motor speed versus saw motor current response.

Figure 5A:
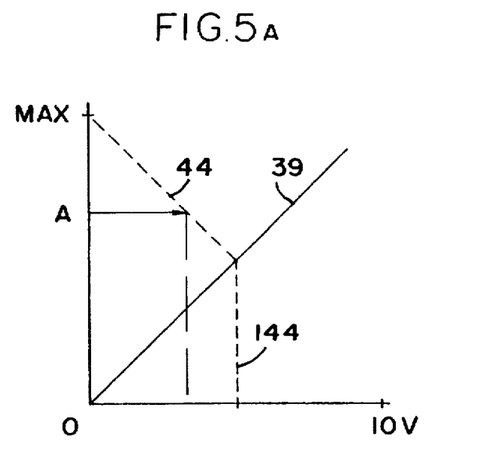
FIG. 5a to c depict transfer functions as may occur in the system of FIG. 1.
Figure 5B:
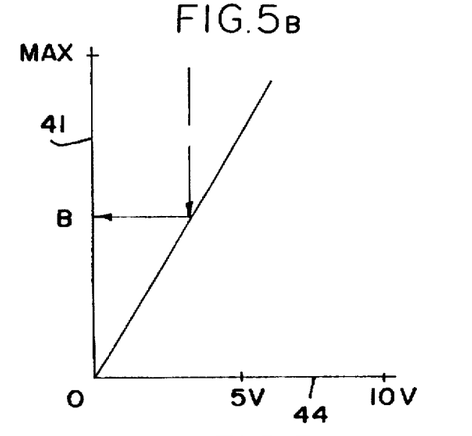
Figure 5C:
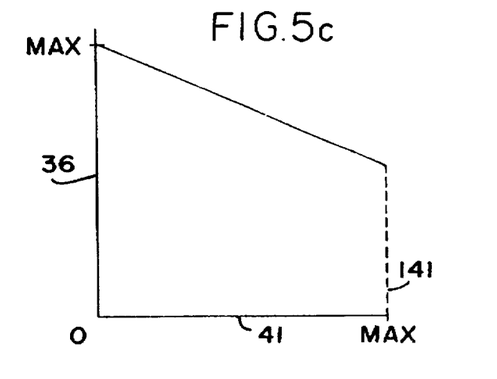

FIG. 5a to c depict the resulting transfer function.

In particular, FIG. 5a shows at 144 an increase in the slope of the course of the signal 44 versus current of the toolhead drive motor 36 at the line for the signal 39, such as caused by the diode or other device 233.

The graph of FIG. 5b has a steeper slope for the control voltage 44 versus speed of motor 41, than the graph of FIG. 2b. This slope was adjusted by changing the control parameters of the drive motor control inverter 40. Accordingly, a motor 36 current intensity A provides a relatively higher speed B for the tool advance motor 41 in the control depicted in FIGS. 5a and 5b than in the control depicted in FIGS. 2a and 2b.

As seen in FIG. 5c, the slope of the resulting motor 41 speed versus motor 36 current may be less or flatter than the corresponding slope in FIG. 2c, but the speed of the tool advance motor 41 may remain essentially constant, such as shown at 141 in FIG. 5c, until the current drawn by the toolhead drive motor 36 increases significantly, indicating a reinforcing iron or other obstacle in the path of the saw blade, drill bit or other tool, requiring a rapid shutdown of the tool advance.

Figure 6:
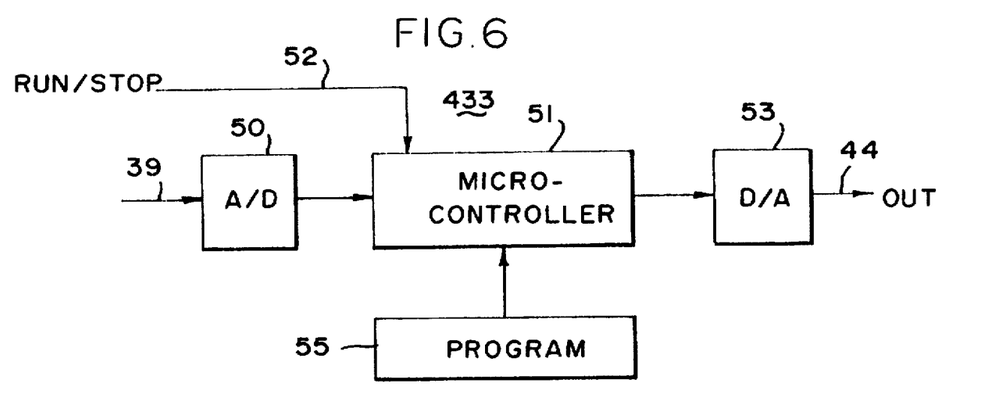
FIG. 6 is a block diagram of a digital signal processing implementation of the interface module shown in FIG. 1, pursuant to a preferred embodiment of the invention.

FIG. 6 is a block diagram of a digital signal processing implementation 433 of the interface module 33, pursuant to a preferred embodiment of the invention.

According to FIG. 6, the analog current monitor voltage output signal 39 of the motor control inverter 35 is applied to an analog-to-digital converter A/D 50 and hence as a digitized current monitor voltage signal to a microcontroller 51 controlled by a run/stop command 52 that may be provided by an operator, such as through a portable on/off switch (not shown).

The output of the microcontroller 51 is applied to a digital-to-analog converter D/A 53 and hence as the analog speed control signal 44 to the motor control inverter 40.

Figure 7A:
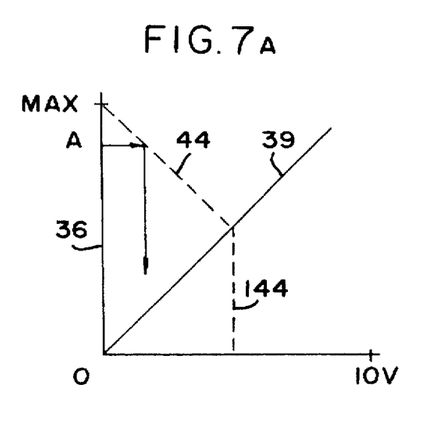
FIGS. 7a, b and c illustrate characteristics that may be embodied in the interface modules according to FIGS. 4 or 6, such as in the system of FIG. 1.

FIGS. 7a, b and c illustrate a further embodiment of the invention that may be implemented with interface modules according to FIGS. 4 or 6, such as in the system 30 of FIG. 1.

As apparent from FIGS. 5a and 7a, the microcontroller embodiment 433 of FIG. 6 also may provide the analog speed control signal 44 with slope decrease or dropoff 144 in relation to the motor 36 current versus monitor output voltage 39 function of the system 30.

Figure 7B:
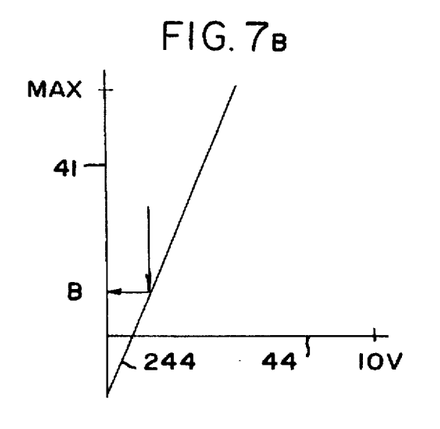
Figure 7C:
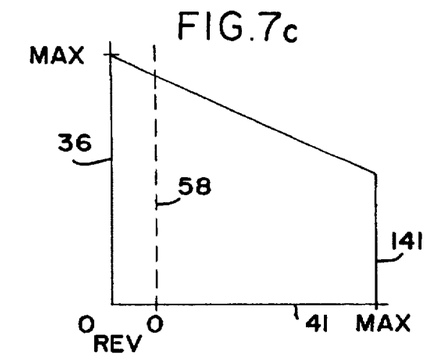

In this or any other manner within the scope of the invention, including suitable adjustment of the motor control inverter 35, the motor 41 speed versus speed control voltage 44 characteristic may be provided with a negative branch 244 as seen in FIG. 7b, whereby the direction of rotation of the auxiliary motor 41 will be able to reverse, such as illustrated in FIG. 7c.

In particular, if the current draw by the tool or toolhead 37 drive motor 36 increase suddenly to maximum, the speed of the tool advance motor 41 not only goes first to zero, but the direction of rotation of that motor 41 reverses, such as seen in FIG. 7c to the left of the zero-speed dotted line 58.

In this or any other manner within the scope of the invention, the driven tool may automatically be backed of an obstruction encountered by the tool in the workpiece, such as a reinforcing steel bar 148 or the like in a concrete slab 48, in the case of concrete saws or core drills, for instance.

In practice, this further protects the tool and the equipment connected thereto against damage and operating personnel against injury.

FIGS. 1, 3 and 4 show pin numbers that relate to pin numbers of the above mentioned GPD 503 and GPD 333 motor control inverters.

Figure 10:
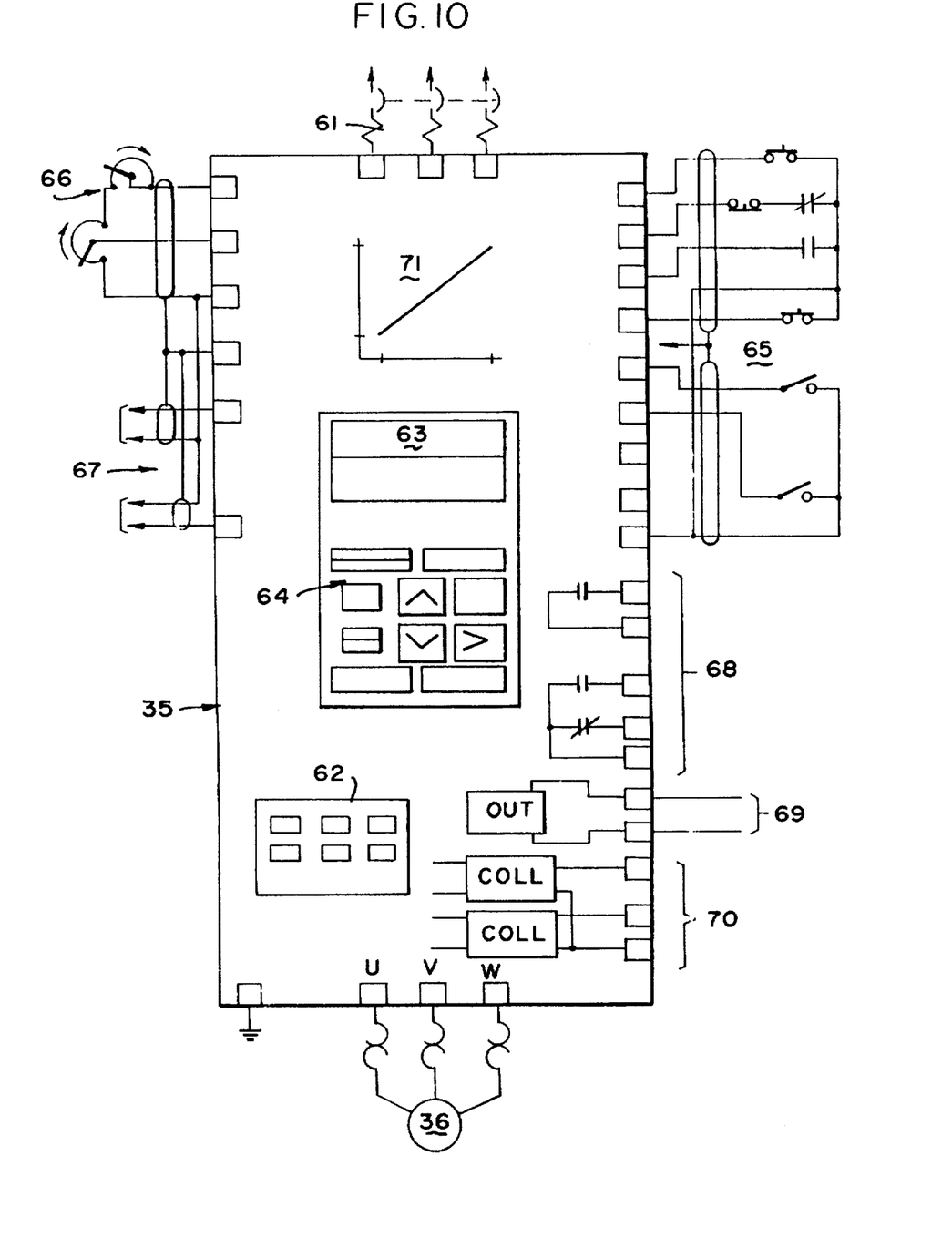
FIG. 10 is a schematic of a motor control inverter that may be used in the system of FIG. 1.

The accompanying FIG. 10 shows further parts of a schematic for the motor control inverter 35, such as shown in FIG. 1–4A on page 1–11 of the above mentioned GPD 503 Technical Manual 4231. The parts and circuits in FIG. 10 may be conventional as such, including a connection 61 to a three-phase outlet or other power supply, a voltage selector 62, a digital operator 63, run/stop, forward/reverse, jog, reset and other manual controls 64, a run/stop, forward/reverse, automatic/manual, and reset remote control 65, manual speed controls 66, an auto reference 67, a relay contract capacity 68, a monitor output 69, and open collector circuits 70, such as shown and described in the above mentioned Manual 4231. FIG. 10 also shows an output voltage versus output frequency profile 71 of that motor control inverter.

Figure 11:
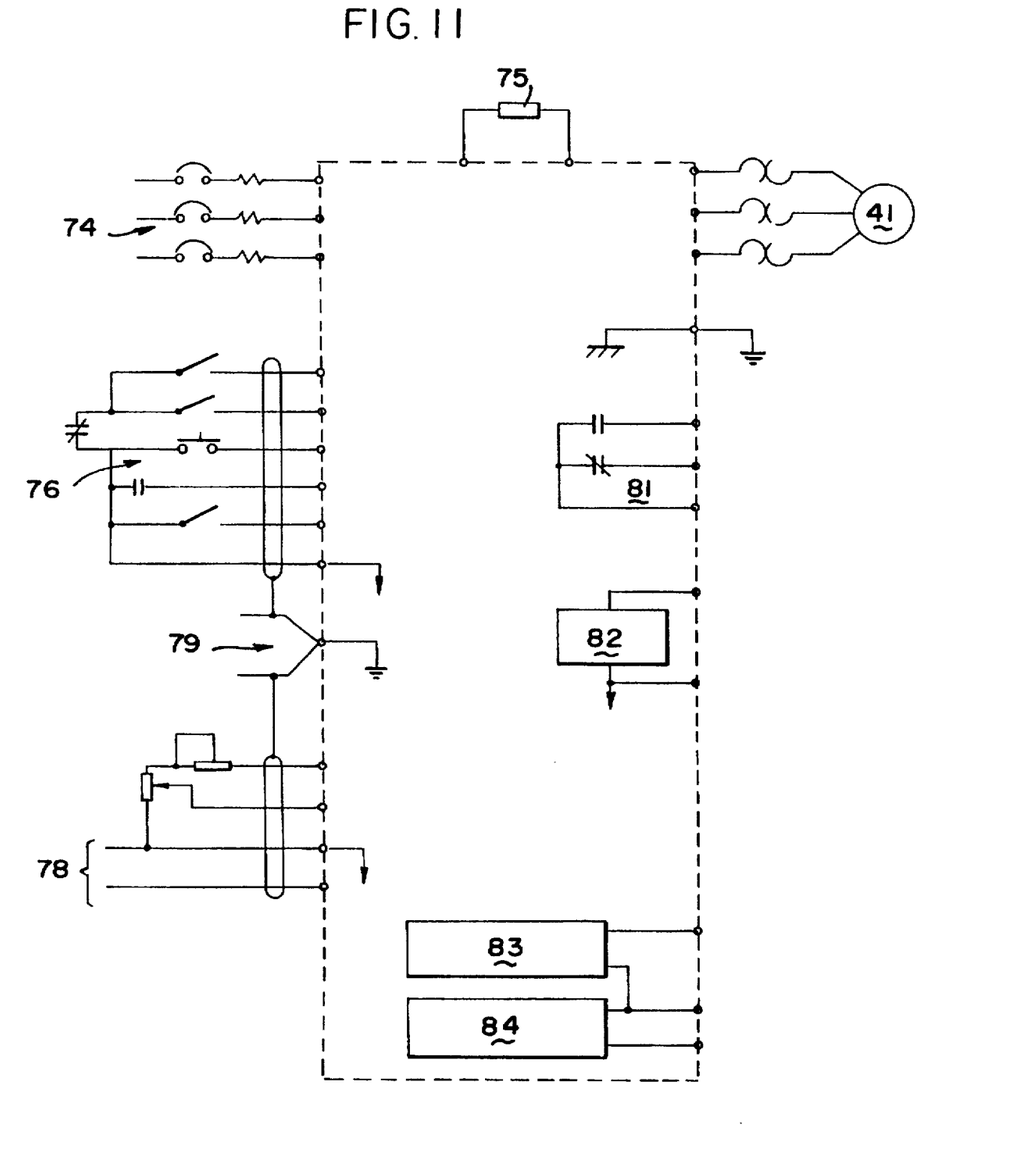
FIG. 11 is a schematic of another motor control inverter that may be used in the system of FIG. 1, as more fully disclosed below.

Similarly, the accompanying FIG. 11 shows further parts of a schematic for the motor control inverter 40, such as shown in FIG. 1–5 on page 11 of the above mentioned GPD 333 Technical Manual 4333, including a connection 74 to a three-phase outlet or other power supply, a braking resistor 75, run/stop, forward/reverse, reset and other manual controls 76, a manual speed control 78, a shielded connection terminal 79, relay contact capacity 81, an analog monitor output 82, and open collector circuits 83 and 84 supplying open collector outputs, such as shown and described in the above mentioned Technical Manual 4333.

These inverter motor controls have the capability of providing the reversal of direction of drive or feed motors 35, 41 and 241 upon imprinting of selected control constants into the inverter motor controls 35, 40 and/or 240.

The function illustrated in FIGS. 7b and 7c may thus be performed with logic circuit interface modules of the type shown in FIGS. 3 or 4, or with microcontroller type of modules of the type shown in FIG. 6.

Microcontroller embodiments of the subject invention are, however, much more versatile than logic circuit embodiments, including the operational amplifier embodiments shown in FIGS. 3 and 4.

According to FIG. 6, the microcontroller 51 is controlled by a program 55 and for that purpose may, for instance, have a lookup table.

Figure 8A:
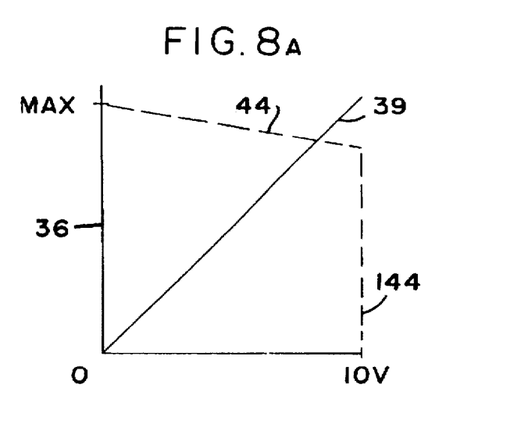
FIGS. 8a, b and c illustrate further characteristics that may be embodied in the system of FIG. 1.
Figure 8B:
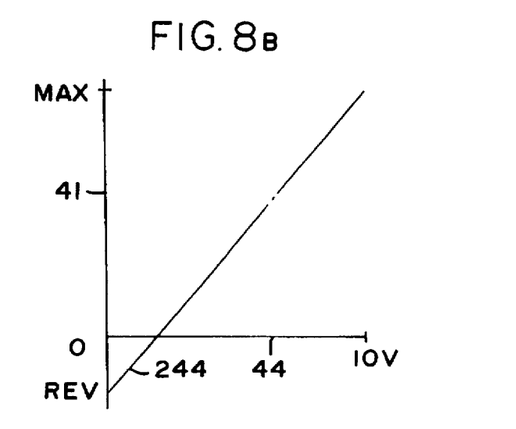
Figure 8C:
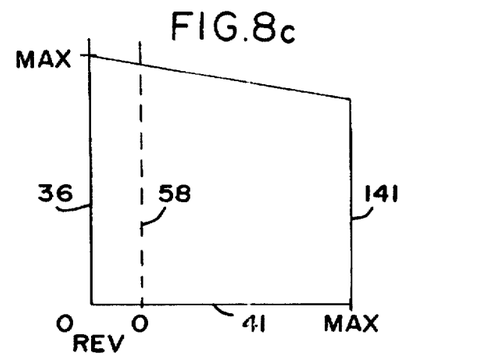

FIG. 8 is a representation of the saw current versus the drive motor speed for a microcontroller based interface module, such as shown at 433 in FIG. 6.

As before, the solid line in FIG. 8a represents the monitor voltage output as a function of the saw blade motor current. The dashed line on FIG. 8a represents the output of the Control Interface Module 433. Notice that in comparison with pervious examples, it maintains the constant 10 volts output to a much higher level of saw blade motor 36 current, before it starts to ramp to 0 volts at Max. Current. This implies that the average slew rate of the feed motor will be higher than before.

FIG. 8b represents the control input voltage 44 into the motor speed control inverter 40 or 240 versus the resulting speed of the motor 41 or 241. Notice that the inverter has been set to the Max speed at a 10 volt input, to stop at about 1.5 volts and to have the motor 41 or 241 rotating in the reverse direction for control voltages less than that, such as shown at 244 in FIG. 8b.

FIG. 8c is a plot of the resulting feed motor 41 or 241 speed versus drive motor 36 current.

Further developments within the scope of the invention include different ramp up and ramp down rates for the microcontroller produced control signal 44. For instance, a slower ramp up rate will minimize response to current surges in the current of the drive motor 36 and thus will contribute to a smoother or less jerky control of the feed motors 41 and 241

Figure 9:
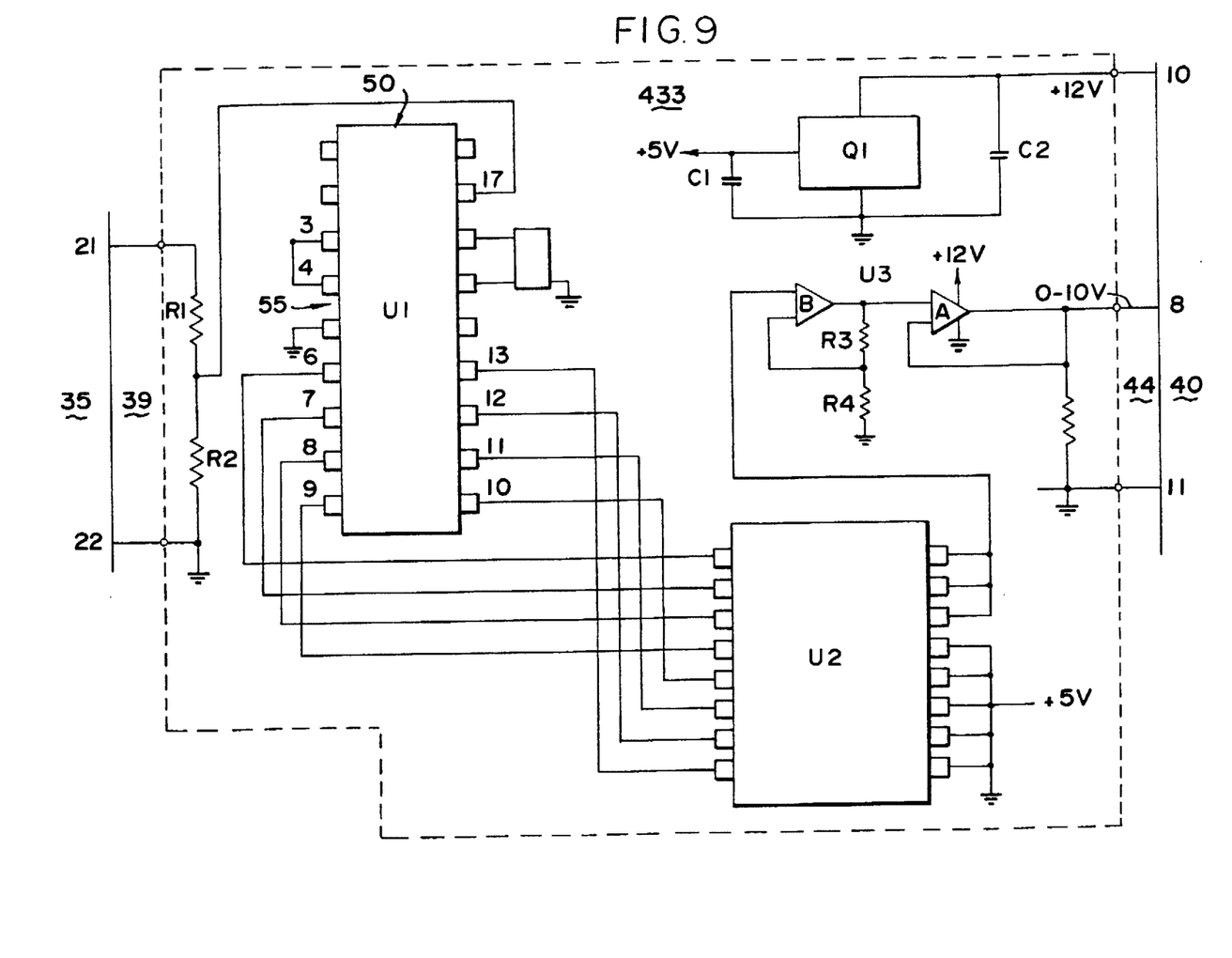
FIG. 9 is a circuit diagram of a microcontroller interface module according to a preferred embodiment that may be implemented in the system of FIG. 1.

A preferred embodiment of the microcontroller interface module 433 is shown in FIG. 9. As before, the voltage to power the unit may be provided from an output source on the inverter motor control 40. However, the interface module 433 may be self-powered.

Q1 in FIG. 9, an LM78L05, is a fixed +5 volt regulator. It utilizes the +12 Volt source from the motor control 40 and converts it to 5 Volts for use in U1 and U2. C1 and C2 are power supply filter capacitors for the +5 volt and +12 volt supplies, respectively.

By way of example, the interface module input signal 39 from the inverter motor control 35 has a magnitude of 0 to 10 volts and is proportional to the magnitude of the current of the tool drive motor 36 which ranges from 0 to Maximum current. The Analog to Digital converter (A/D) 50 which is incorporated in U1, the Microchip PIC 16C71, has an input range of 0 to 5 volts, thus, Resistors R1 and R2 are required to divide the input signal so that it can be processed by the A/D converter. Terminal RAO, pin 17, on U1 is the input to the internal A/D converter. The microcontroller digitizes the input signal, processes the information in accordance to its programmed instructions and outputs the information to U2, an AD557 Digital to Analog (D/A) converter. The analog output of this component is in the range of 0 to 2.5 volts. U3B, part of the dual operational amplifier model number LT 1013, is used to amplify this signal to the required 0 to 10 volt range. R3 and R4 set this gain.

U3A is used as a buffer amplifier to send the control output signal 44 to the motor control inverter 40 which is used to power the tool advance or feed motor 40 and/or its counterpart 241 via a second tool advance, tool feed or auxiliary inverter motor control 240.

Of course, practice of the invention and its embodiments, including the implementation of the embodiment of FIG. 6, FIGS. 7a to c, FIGS. 8a to c and/or FIG. 9 is not limited to use of specific apparatus.

Preferred embodiments of the invention reside in methods and apparatus for driving and advancing a power tool 37, and comprising steps of, or means for, providing a power drive 31 for driving such power tool 37, providing an auxiliary drive 32 for advancing that power tool driven by the power drive, sensing power applied by the power drive to the power tool in driving that power tool, and automatically energizing the auxiliary drive for advancing the power tool inversely proportional to the power applied by the power drive to the power tool, such as shown at 33 in FIGS. 1, 2a to c, 3, 4, 5a to c, 6, 7a to c, 8a to c, 9, 10 and/or 11, or otherwise within the scope of the invention.

Such sensing may include sensing a draw of power by the power drive 36 from a source of power 35 in driving said power tool 37, and said auxiliary drive 32 for advancing said power tool may be energized inversely proportional to said power draw of said power drive.

The power drive 31 may be provided with a first electric motor 36 for driving said power tool 37. The auxiliary drive 32 may be provided with a second electric motor 41 for advancing said power tool driven by said first electric motor in said power drive.

Said sensing may include sensing power applied by said first electric motor to said power tool in driving said power tool and said second electric motor 41 in said auxiliary drive 32 is energized inversely proportional to said power applied by said first electric motor to said power tool.

Where the power drive 31 is provided with a first electric motor for driving said power tool 37, and said auxiliary drive 32 is provided with a second electric motor 41 for advancing said power tool driven by said first electric motor in said power drive, said sensing may include sensing a draw of power of said first electric motor 36 from an electric power source 35 in driving said power tool, and said second electric motor 41 in said auxiliary drive 32 may be energized inversely proportional to said power draw of said first electric motor from said electric power source in driving said power tool.

The power tool 37 may be mounted on a carriage, such as symbolically indicated at 142 in FIG. 1. The power tool 37 may be driven with said power drive 31 while on said carriage 142. The carriage may be advanced with said auxiliary drive 32, such as on a track, while said power tool 37 mounted on said carriage 142 is driven by said power drive 31, and the auxiliary drive 32 is automatically energized inversely proportional to said power applied by said power drive to said power tool while on said carriage, for advancing said carriage while said power tool mounted on said carriage is driven by said power drive 31.

The tool advance component 32 may be duplicated or replicated to provide more than one drive for the advance or transport of the tool or toolhead relative to the workpiece, or to provide alternative drives.

By way of example, the tool advance or feed component 32 may be a first auxiliary drive for advancing in a first direction 46 said power tool 37 driven by said power drive 31. A second auxiliary drive may then be provided for advancing in a second direction 47, at an angle to said first direction 46, said power tool driven by said power drive. FIG. 1 indicates examples of such two possible directions, and also shows a second tool advance component or auxiliary drive 132 for advancing the tool or toolhead 37 in the second direction 47, such as indicated by a phantom line 242 in FIG. 1.

Power applied by said power drive 35 to said power tool 37 in driving said power tool is again sensed, and said auxiliary drives 32 and 132 for advancing said power tool in said first and second directions are automatically energized inversely proportional to said power applied by said power drive to said power tool 37.

Such sensing may include sensing a draw of power by said power drive 36 from a source of power 35 in driving said power tool 37, and said auxiliary drives 32 and 132 for advancing said power tool in said first and second directions 46 and 47 are energized inversely proportional to said power draw of said power drive.

The power drive 31 may be provided with a first electric motor 36 for driving said power tool 37. The first auxiliary drive 32 may be provided with a second electric motor 41 for advancing in said first direction 46 said power tool driven by said first electric motor 36 in said power drive 31. The second auxiliary drive 132 may be provided with a third electric motor 241 for advancing in a second direction 47, at an angle to said first direction 46, said power tool 37 driven by said power drive 31. The sensing may then include sensing a draw of power of said first electric motor 36 from an electric power source 35 in driving said power tool 37.

The second electric motor 41 in said auxiliary drive 32 is energized inversely proportional to said power draw of said first electric motor from said electric power source in driving said power tool. The third electric motor 241 in said second auxiliary drive 132 is energized, such as through a third motor control inverter 240, inversely proportional to said power draw of said first electric motor from said electric power source in driving said power tool.

Within the scope of the invention, there may be provided a first carriage 42 movable in a first direction 46, and a second carriage 142 movable in a second direction 47 at right angles or at any other angle to said first direction 46. The second carriage 142 may be mounted on said first carriage 42. As indicated by a phantom line 242, the power tool 37 may be mounted on said second carriage 142 which is mounted on said first carriage 42.

The power tool 37 is driven with said power drive 31 while on said second carriage 142. The first carriage 42 is driven with said first auxiliary drive 32 while said power tool 37 mounted on said second carriage 142 is driven by said power drive 31. By way of example, a saw blade, drill bit or other power tool may thus be applied to a workpiece.

The second carriage 142 is automatically driven with said second auxiliary drive 132 while said power tool mounted on said second carriage is driven by said power drive. By way of example, the saw blade, drill bit or other power tool 37 on its first and second carriages 42 and 142 may thus be applied to a workpiece 48, while being protected against damage from reinforcing bars or other obstacles 148 in such workpiece by one of the automatic control systems herein disclosed, such as the controlled first auxiliary drive 32. After the applied tool 37 has thus reached its desired position or level in the workpiece 48, the carriage 142 may be driven by the second auxiliary drive 132. A switch 60 in FIG. 1 indicates that the drive 132 may alternatively be switched "on" and "off." Of course, a typical switching arrangement more likely would involve a double-throw type of switching arrangement, capable of switching the auxiliary drives between 32 and 132, but there may be applications where the first auxiliary power drive 32 remains active, while the second auxiliary power drive is also active, such as when the tool is driven simultaneously with respect to x-y coordinates, for instance.

Either way, after the tool 37 has been applied to the workpiece 48 by the first auxiliary drive 32, it may be driven along a track 49 by the second auxiliary drive 132, again under the protection of the inverter arrangement or microcontroller system against damage and injury.

By way of example, the auxiliary drives 32 and 132 are automatically energized inversely proportional to said power applied by said power drive 31 to said power tool 37 while on said second carriage 142, for advancement of said first and second carriages 42 and 142 while said power tool 37 mounted on said second carriage is driven by said power drive 31.

The above mentioned power invertor equipment is optimally suited for performing requisite power or current sensing and automatic energizing functions herein disclosed.

Specific embodiments herein shown essentially sense electric current, such as the current drawn or required by the toolhead drive motor 36. In parts of this disclosure and in the accompanying claims, this is expressed as sensing power, such as power applied to the power tool 37, or as sensing power draw. This is appropriate for at least three reasons. Firstly, electric current becomes closely related to power near maximum load conditions at the tool 37. Secondly, sensing power, rather than just current is within the scope of the invention and its illustrated embodiments. Thirdly, the expression "power" is a broad term, as already mentioned above under the Summary of the Invention.

The subject extensive disclosure will render apparent or suggest to those skilled in the art various modifications and variations within the spirit and scope of the invention.

We claim:

1. In a method of cutting a workpiece with a cutting tool rotated relative to the workpiece by an electric drive motor and advanced in said workpiece by an electric tool advance, the improvement comprising in combination:

sensing obstacles to cutting in said workpiece by sensing an increasing draw of electric power of said electric drive motor in rotating said cutting tool relative to said workpiece;

automatically slowing down said electric tool advance in response to said increasing draw of electric power;

cutting through a sensed obstacle in said workpiece with said cutting tool by driving said cutting tool with the slowed-down electric tool advance;

automatically restoring the speed of the slowed-down electric tool advance in response to a decrease in the sensed draw of electric power of said electric drive motor in rotating said cutting tool relative to said workpiece; and advancing said cutting tool in said workpiece with said electric tool advance at the restored speed.

2. A method as in claim 1, wherein:

the speed of the electric tool advance is varied substantially inversely proportional to variations in said draw of electric power of said electric drive motor in rotating said cutting tool relative to said workpiece.

3. A method as in claim 1, wherein:

the speed of the electric tool advance is maintained substantially constant until said sensed draw of electric power of said electric drive motor indicates a sensed obstacle to cutting in said workpiece, and is then slowed down for cutting through that sensed obstacle with said cutting tool.

4. A method as in claim 1, wherein:

said cutting tool is backed off a sensed obstacle in the workpiece by automatically reversing said electric tool advance.

5. A method as in claim 1, wherein:

said cutting tool is advanced with said electric tool advance in a first direction and in a second direction at an angle to said first direction; and said sensing of obstacles to cutting in said workpiece, said slowing down and said restoring of speed of the electric tool advance, are performed during tool advance in said first and in said second directions.

6. A method as in claim 5, wherein:

said cutting tool is applied to said workpiece with said electric tool advance advancing said cutting tool in said first direction, and said workpiece is cut with said cutting tool in said second direction.

7. In a method of cutting reinforced concrete with a concrete cutting tool rotated by an electric drive motor and advanced in said reinforced concrete by an electric tool advance, the improvement comprising in combination:

sensing obstacles to cutting in said reinforced concrete including reinforcing bars by sensing an increasing draw of electric power of said electric drive motor in rotating said concrete cutting tool in said reinforced concrete;

automatically slowing down said electric tool advance in response to said increasing draw of electric power;

cutting through a sensed obstacle in said reinforced concrete with said concrete cutting tool by driving said concrete cutting tool with the slowed-down electric tool advance;

automatically restoring the speed of the slowed-down electric tool advance in response to a decrease in the sensed draw of electric power of said electric drive motor in rotating said concrete cutting tool in said reinforced concrete; and advancing said concrete cutting tool in said reinforced concrete with said electric tool advance at the restored speed.

8. A method as in claim 7, wherein:

the speed of the electric tool advance is varied substantially inversely proportional to variations in said draw of electric power of said electric drive motor in rotating said concrete cutting tool relative to said workpiece.

9. A method as in claim 7, wherein:

the speed of the electric tool advance is maintained substantially constant until said sensed draw of electric power of said electric drive motor indicates a sensed obstacle to cutting in said reinforced concrete, and is then slowed down for cutting through that sensed obstacle with said concrete cutting tool.

10. A method as in claim 7, wherein:

said concrete cutting tool is backed off a sensed obstacle in the reinforced concrete by automatically reversing said electric tool advance.

11. A method as in claim 7, wherein:

said concrete cutting tool is advanced with said electric tool advance in a first direction and in a second direction at an angle to said first direction; and said sensing of obstacles to cutting in said reinforced concrete, said slowing down and said restoring of speed of the electric tool advance, are performed during tool advance in said first and in said second directions.

12. A method as in claim 11, wherein:

said concrete cutting tool is applied to said reinforced concrete with said electric tool advance advancing said concrete cutting tool in said first direction, and said reinforced concrete is cut with said concrete cutting tool in said second direction.

13. In apparatus for cutting a workpiece with a cutting tool rotated relative to the workpiece by an electric drive motor and advanced in said workpiece by an electric tool advance, the improvement comprising in combination:

means for sensing obstacles to cutting in said workpiece, including means for sensing an increasing draw of electric power of said electric drive motor in rotating said cutting tool relative to said workpiece;

means between said means for sensing an increasing draw of electric power and said electric tool advance for automatically slowing down said electric tool advance in response to said increasing draw of electric power so that said cutting tool cuts through a sensed obstacle in said workpiece while being driven with the slowed-down electric tool advance; and means for automatically restoring the speed of the slowed-down electric tool advance in response to a decrease in the sensed draw of electric power of said electric drive motor in rotating said cutting tool relative to said workpiece so that said cutting tool is advanced in said workpiece with said electric tool advance at the restored speed.

14. Apparatus as in claim 13, wherein:

said means for automatically slowing down said electric tool advance include means for varying the speed of said electric advance substantially inversely proportional to increases in said draw of electric power of said electric drive motor in rotating said cutting tool relative to said workpiece.

15. Apparatus as in claim 13, wherein:

said means for automatically slowing down said electric tool advance include means for maintaining the speed of the electric tool advance substantially constant until said sensed draw of electric power of said electric drive motor indicates a sensed obstacle to cutting in said workpiece, and for then slowing down said electric power tool advance for cutting through that sensed obstacle with said cutting tool.

16. Apparatus as in claim 13, wherein:

said means for automatically slowing down said electric tool advance include means for automatically reversing said electric tool advance so as to back said cutting tool off a sensed obstacle in the workpiece.

17. Apparatus as in claim 13, wherein:

said electric tool advance includes means for advancing said cutting tool in a first direction and in a second direction at an angle to said first direction.

18. Apparatus as in claim 17, wherein:

said electric tool advance includes means for applying said cutting tool to said workpiece in said first direction, and means for cutting said workpiece with said cutting tool in said second direction.

19. In apparatus for cutting reinforced concrete with a concrete cutting tool rotated by an electric drive motor and advanced in said reinforced concrete by an electric tool advance, the improvement comprising in combination:

means for sensing obstacles to cutting in said reinforced concrete including reinforcing bars, including means for sensing an increasing draw of electric power of said electric drive motor in rotating said concrete cutting tool relative to said reinforced concrete;

means between said means for sensing an increasing draw of electric power and said electric tool advance for automatically slowing down said electric tool advance in response to said increasing draw of electric power so that said concrete cutting tool cuts through a sensed obstacle in said reinforced concrete while being driven with the slowed-down electric tool advance; and means for automatically restoring the speed of the slowed-down electric tool advance in response to a decrease in the sensed draw of electric power of said electric drive motor in rotating said concrete cutting tool in said reinforced concrete so that said concrete cutting tool is advanced in said reinforced concrete with said electric tool advance at the restored speed.

20. Apparatus as in claim 19, wherein:

said electric tool advance includes means for applying said concrete cutting tool to said reinforced concrete in a first direction, and means for cutting said reinforced concrete with said applied concrete cutting tool in a second direction at an angle to said first direction.

* * * * *